United States Patent [19]

Spindel, Jr.

[11] Patent Number: 5,165,202
[45] Date of Patent: Nov. 24, 1992

[54] METHODS AND APPARATUS FOR MAKING SPECTACLE FRAME LENS PATTERNS

[76] Inventor: Gilbert D. Spindel, Jr., 5455 Buford Hwy., A-214, Atlanta, Ga. 30340

[21] Appl. No.: 779,381

[22] Filed: Oct. 18, 1991

[51] Int. Cl.[5] .............................................. B24B 9/14
[52] U.S. Cl. .................... 51/101 LG; 83/413; 51/105 LG; 51/106 LG; 51/101 R
[58] Field of Search .......... 51/100 R, 101 R, 101 LG, 51/105 LG, 106 LG, 284 E, 284 R; 409/104, 111, 112, 122, 123, 124; 83/413, 565

[56] References Cited

U.S. PATENT DOCUMENTS

| | | |
|---|---|---|
| 686,676 | 11/1901 | Long . |
| 980,133 | 12/1910 | Slavin . |
| 2,068,890 | 1/1937 | Sassen ................................ 409/104 |
| 2,143,258 | 1/1939 | Bickel ................................ 409/104 |
| 2,231,994 | 2/1941 | Flattem . |
| 2,333,064 | 10/1943 | Williams ....................... 51/101 LG |
| 2,395,376 | 2/1946 | Long . |
| 2,604,697 | 7/1952 | Aulin . |
| 3,158,967 | 12/1964 | Reaser . |
| 3,170,374 | 2/1965 | Clar . |
| 3,459,085 | 8/1969 | Takubo . |
| 4,191,501 | 3/1980 | Sinklier ............................. 409/104 |
| 4,233,784 | 11/1980 | Loreto . |
| 4,300,317 | 11/1981 | Croft et al. . |
| 4,394,099 | 7/1983 | Santinelli ....................... 51/101 LG |
| 4,503,613 | 3/1985 | Yax . |
| 4,596,091 | 6/1986 | Daboudet et al. . |
| 4,612,736 | 9/1986 | Massard et al. . |
| 4,667,444 | 5/1987 | Langlois et al. . |
| 4,693,034 | 9/1987 | Vance et al. . |
| 4,829,715 | 5/1989 | Langlois et al. . |

Primary Examiner—Bruce M. Kisliuk
Assistant Examiner—Jack Lavinder
Attorney, Agent, or Firm—Kilpatrick & Cody

[57] ABSTRACT

Apparatus and methods for making spectacle lens patterns are disclosed. The apparatus uses a router (or similar) bit, a spring-loaded, adjustable follower, and an existing lens (or pre-cut model) to produce patterned blanks either identically or proportionally sized to corresponding template or model lenses. The router bit rotates rapidly about its longitudinal axis as it penetrates the slowly rotating blank, producing a smooth pattern after as few as one rotation of the blank. The cover of the invention maintains the follower and cutting bit in suitable (albeit adjustable) alignment while permitting easy access to the interior of the device for inserting and removing both the lens and blank. A chute, pouch, or chip containment cavity may also be included to receive the by-products of the cutting operation for easy disposal.

17 Claims, 3 Drawing Sheets

METHODS AND APPARATUS FOR MAKING SPECTACLE FRAME LENS PATTERNS

This invention relates to optical lens preparation and more particularly to methods and apparatus for making spectacle frame lens patterns from, for example, existing lenses or pre-contoured models.

BACKGROUND OF THE INVENTION

The need to replace a damaged (or simply duplicate a) spectacle lens of a patient arises repeatedly in the vision care field. Often, the patient's eyeglass frames and other spectacle lens remain intact and undamaged. In these cases the practitioner merely removes the damaged lens from its frame (if necessary) and, with a writing instrument, traces either the frame socket or the circumference of the lens itself (if intact) onto a flat cutting blank. The blank, made typically of firm plastic, can then be cut along the marked circumference with scissors or a knife until its contour matches that of the lens or empty frame socket.

The contoured blank may then serve as a pattern from which a replacement lens can be made. Some edging machines, such as those described in the section of U.S. Pat. No. 4,693,034 entitled "BACKGROUND OF THE INVENTION" and whose structural attributes are incorporated herein by this reference, mount both the contoured blank and the replacement lens on a floating axle, causing the blank to function as a cam permitting the grinding surface to contact portions of the periphery of the replacement lens. Through many rotations of the lens the grinding surface selectively reduces the radius of the lens by grinding along its edge until the lens is contoured similarly to the blank.

Another machine, disclosed in U.S. Pat. No. 2,231,994 to Flattem, uses a follower and a diamond or wheel-equipped cutting tool to etch the outline of a lens on a face of a glass blank. Although the blank rotates as a hand crank is turned, the diamond tool does not rotate and the alternative etching wheels rotate only in response to movement of the blank. Moreover, because the cutting tool does not perforate the entire depth of the blank, after the outline is etched the practitioner or technician, using the outline as a guide, must separate (by breaking) the patterned portion of the blank from its remainder. The requirement of separating the portions of the blank manually increases the likelihood that discontinuities will be present in the contour of the blank near the reverse face as well as the possibility of injury to the practitioner, technician, or bystanders from sharp, broken glass.

U.S. Pat. No. 3,170,374 to Clar illustrates a pattern-producing apparatus for spectacle lenses using a spectacle frame socket as a template rather than the lens itself. The apparatus includes an end milling tool for cutting lateral entry groove or notch in a lens blank. After the groove is formed a motor activates to rotate both the blank and a guide roller within one frame socket, causing the effective cutting edge of the end milling tool to form the pattern in the blank. Utilizing a spectacle frame socket as the template is awkward and unwieldy, however, requiring radically eccentric rotation of the frame itself. The guide periphery and cutting edge of the end milling tool are also permanently aligned, precluding proportional sizing of the blank relative to the template.

SUMMARY OF THE INVENTION

The present invention provides another pattern-making apparatus as an improved alternative to those referenced above. Using a router (or similar) bit, an adjustable follower, and an existing lens (or pre-contoured model) instead of a frame socket, the apparatus of the present invention penetrates the depth of the blank to produce patterned blanks either identically or proportionally sized to their corresponding lenses. Unlike the cutters disclosed in the Flattem patent, moreover, the router bit of the present invention rotates rapidly about its longitudinal axis as it penetrates the rotating blank. This rapid rotation produces a smooth pattern after as few as one rotation of the blank, avoiding the need to break the blank along an outline to remove unneeded material. The cover of the invention maintains the follower and cutting bit in suitable (albeit adjustable) alignment while permitting easy access to the interior of the device for inserting and removing both the lens and blank. A chute, pouch, or chip containment cavity may also be included to receive the by-products of the cutting operation for easy disposal.

It is therefore an object of the present invention to provide an improved spectacle lens pattern-making apparatus.

It is another object of the present invention to provide an apparatus utilizing a rapidly rotating cutting bit that penetrates the lens blank to produce a smooth contour for the blank.

It is yet another object of the present invention to provide an apparatus having a follower which can be adjusted relative to the cutting bit for producing lens blanks proportional, but not necessarily identical, to their corresponding template lenses.

It is an additional object of the present invention to provide an apparatus having a cover which functions to maintain the follower and cutting bit suitably aligned during the cutting operation.

It is still another object of the present invention to provide a lens pattern-making apparatus including a pouch or other structure for receiving by-products of the cutting operation for easy disposal.

Other objects, features, and advantages of the present invention will become apparent with reference to the remainder of the written portion and drawings of this application.

DETAILED DESCRIPTION

A. Structure

Figure 1:
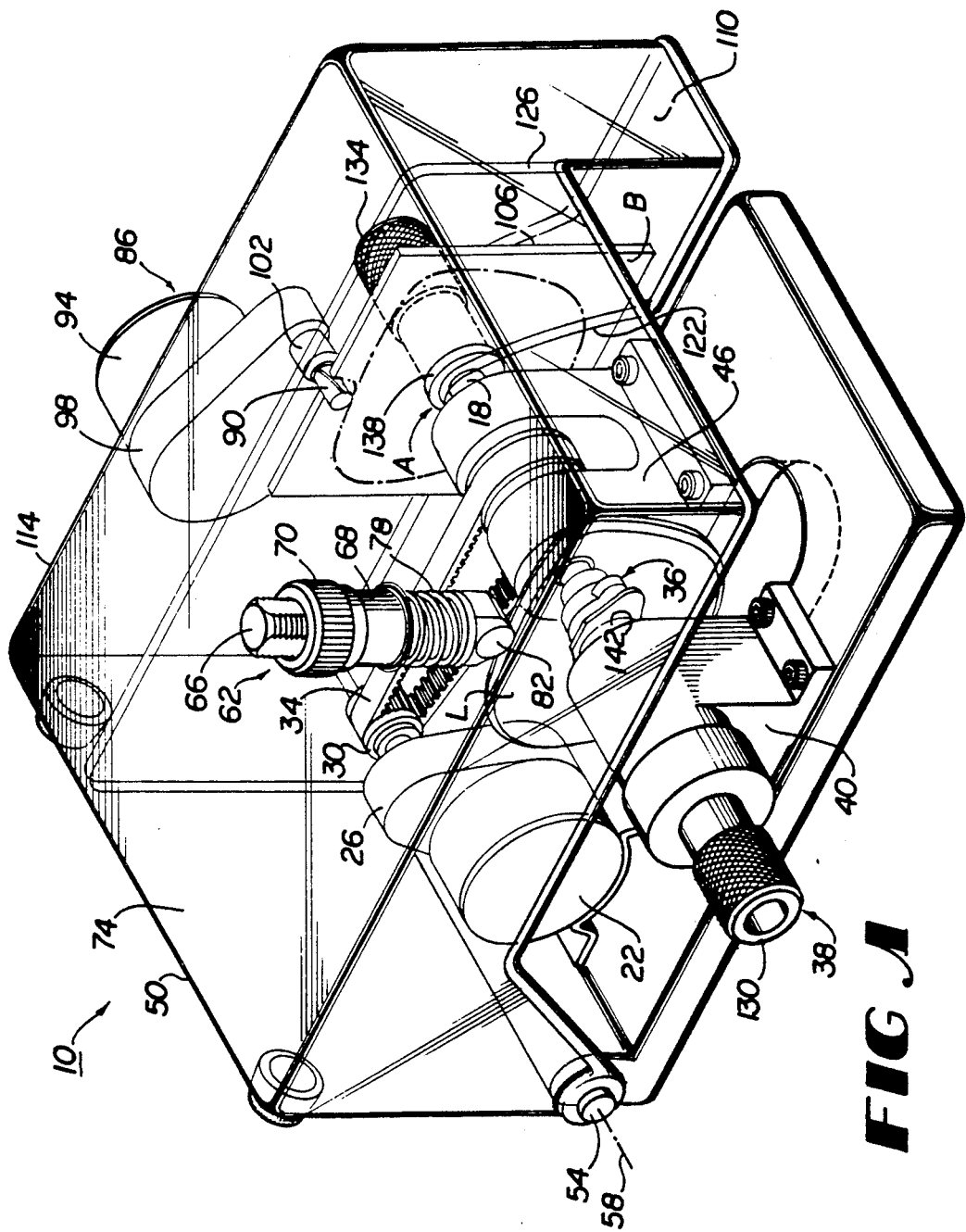
FIG. 1 is a perspective view of the pattern-making apparatus of the present invention.

FIG. 1 illustrates the lens pattern-making apparatus 10 of the present invention. Apparatus 10 includes first and second shaft segments 14 and 18, respectively, and means such as motor 22 for rotating the segments 14 and 18. As shown in FIG. 1, motor 22 is connected to second shaft segment 18 via gear head 26, timing pulley 30, and timing belt 34. Also detailed in FIG. 1 are a master model or lens L, which along with chuck 36 is interposed between the first and second shaft segments 14 and 18 to form a single unitary shaft 38 while apparatus 10 is in use, and a blank B. Lens L typically is an elliptically-contoured spectacle lens, while blank B is a non-contoured plastic, glass, or other appropriate material having a central aperture A for receiving second shaft segment 18. Those skilled in the art will recognize that lens L need not be a spectacle lens, but may be any of a variety of suitable models. Block 40 supports first shaft segment 14 and retains it in position relative to the base 42 of apparatus 10, while block 46 similarly supports and retains second shaft segment 18.

Figure 2:
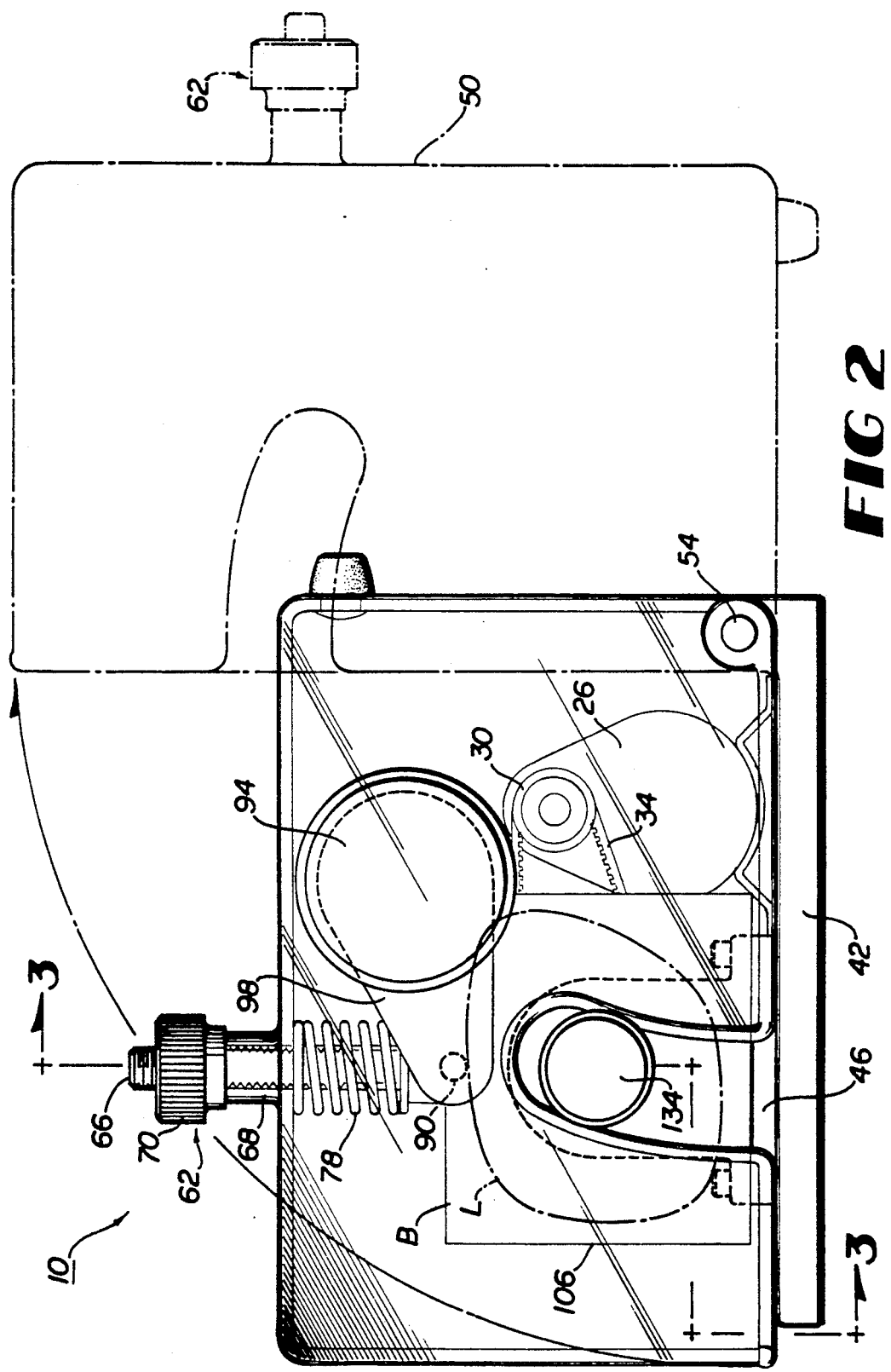
FIG. 2 is a side elevational, partially-sectioned view of the apparatus of FIG. 1 shown with its cover (in phantom lines) open.

Also detailed in FIG. 1 are a variety of other components forming or associated with apparatus 10. Cover or lid 50, for example, may be used in connection with apparatus 10 for (among other things) protecting apparatus 10 from dust or other particles which might otherwise accumulate and affect its operation. Lid 50 similarly may protect the practitioner or technician from chips or other by-products of the operation of apparatus 10. FIG. 1 illustrates lid 50 connected to base 42 using hinge 54, which pivots about axis 58 to permit the lid 50 to be repositioned when inserting or removing lens L or blank B. In an embodiment of apparatus 10 consistent with FIGS. 1-2, lid 50 may be used to support following mechanism 62 and rotate it into position as the lid 50 pivots about axis 58. Following mechanism 62 includes a stanchion 66 penetrating lid 50 through guide 68, with a tension adjustment knob 70 positioned adjacent the exterior 74 of the lid 50, opposite lid 50 from much of the remainder of apparatus 10. Following mechanism 62 also comprises a tension spring 78 or similar resilient member surrounding a portion of stanchion 66 within lid 50 and a follower insert 82 for contacting lens L while apparatus 10 is in use.

Contouring of blank B is performed by shaping mechanism 86, which includes a router bit 90 (or other suitable cutting means) attached to a router motor 94 via gear head 98 and chuck 102. Like following mechanism 62, the shaping mechanism 86 shown in FIG. 1 penetrates and is supported by lid 50, and may be rotated into contact with blank B merely by appropriately pivoting lid 50 about axis 58. The rigidity of lid 50 also fixes the relationship between the following and shaping mechanisms 62 and 86 when, for example, router bit 90 is to be positioned normal to a face 106 of blank B (and the contoured blank B and lens L are to be identically sized). Axles or other devices may be substituted to perform these functions of lid 50, however, and those skilled in the art will recognize that variety of such means exist.

Chute 110 consists of an opening in the housing 114 formed by base 42 and lid 50. Chips or other by-products cast off during operation of apparatus 10 may be received in chute 110 and funnelled to a suitable receptor for easy disposal. Base 42 may also include a slot 118 to accommodate (especially eccentric) rotation of lens L, and lid 50 may contain an arcuate slot 122 in divider wall 126 to permit rotation of blank B.

Shown in FIG. 1 connected to first shaft segment 14 is lens mounting knob 130 and to second shaft segment 18 are blank mounting knob 134 and flange or backing plate 138. Rotation of lens knob 130 is designed to reposition first shaft segment 14 relative to second shaft segment 18, retracting the segment 14 to facilitate insertion or removal of lens L and chuck 36. Removing blank knob 134 allows the aperture A of blank B to receive second shaft segment 18, while fully reattaching blank knob 134 to segment 18 forces the blank B against backing plate 138, retaining blank B in place relative to segment 18.

B. Operation

Figure 3:
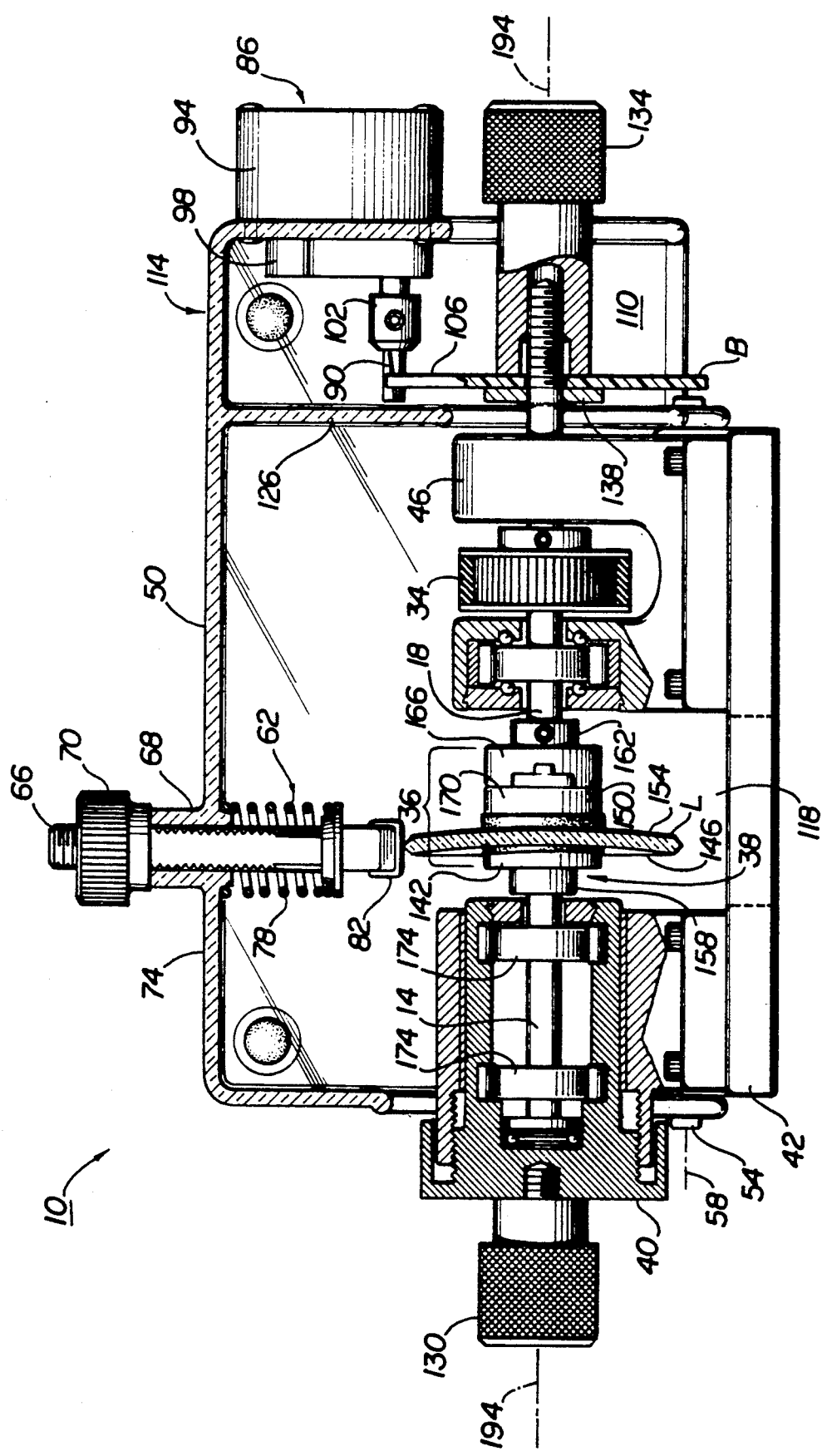
FIG. 3 is a cross-sectional view of the apparatus of FIG. 1 taken along lines 3—3 of FIG. 2.

To operate apparatus 10, an operator (such as the practitioner or a technician or other appropriate person) initially prepares lens L for insertion between first and second shaft segments 14 and 18 by attaching chuck 36 to the len L. Chuck 36 includes a first member 142 (FIG. 3) designed to attach to a first face 146 of len L and a second member 150 for attaching to second face 154 of len L. First and second members 142 and 150 typically contain a pressure-sensitive or other adhesive permitting them to adhere to the respective faces 146 and 154 while apparatus 10 is operating and be removed when operation is complete. First member 142 also is adapted to be engaged by first collar 158 of first shaft segment 14, while second member 150 is engaged by second collar 162 and recepticle 166 of second shaft segment 18. Second member 150 additionally includes a multi-segmented plug 170 for engaging recepticle 166 to retain len L in position relative to unitary shaft 38.

Once chuck 38 is placed about lens L, the operator pivots lid 50 of apparatus 10 from its closed position (FIGS. 1 and 3) to its open position (shown in FIG. 2), removing the following and shaping mechanisms 62 and 86 from the immediate vicinity of the first and second shaft segments 14 and 18. Rotating lens knob 130, the operator retracts first shaft segment 14 (rotating within bearings 174 and 178) from second shaft segment 18 enough to insert lens L and chuck 36 between the segments 14 and 18. Lens knob 130 then is rotated oppositely to secure lens L in place, forming the unitary shaft 38 of apparatus 10.

To position blank B, the operator rotates and removes blank knob 134 from second shaft segment 18. With knob 134 removed, the aperture A of blank B may receive second shaft segment 18 until the blank B reaches backing plate 138. As noted above, fully reattaching blank knob 134 to segment 18 forces the blank B against backing plate 138, retaining blank B in place relative to segment 18.

Following mechanism 62 may then be adjusted relative to shaping mechanism 86. If contoured blank B is desired to be identical in size to lens L, tension adjustment knob 70 may be used to position follower insert 82 an equal distance from lid axis 182 as router bit 90 (whose longitudinal axis 186 will then be parallel to axis 182 and normal to face 106 of blank B). Alternatively, positioning follower insert 82 and router bit 90 at unequal distances from lid axis 182 alters the angles between the bit 90 and both the lid axis 182 and face 106, ultimately producing a contoured blank B of similar peripheral shape as lens L but of different size.

After adjusting following mechanism 62, the operator actuates router motor 94 and pivots lid 50 into its closed position. Closing lid 50 causes the high-speed rotating router bit 90 to penetrate blank B until follower insert 82 contacts lens L (and damps movement of bit 90), thereby cutting a notch in the blank B but not shaping it. The operator then activates motor 22, rotating unitary shaft 38 (with second shaft segment 18 rotating within bearings 190) at a lower speed about its longitudinal axis 194 (which is coincident with the longitudinal axes of the first and second shaft segments 14 and 18). As shaft 38 rotates, so too does lens L, with following mechanism 62 causing (nominally vertical) translation of lid 50 according to the eccentricity of rotation of lens L. Movement of lid 50 results in corresponding translation of router bit 90 as blank B rotates, producing a contoured cut in blank B similar to the peripheral shape of lens L. Because router bit 90 rotates rapidly, a smoothly contoured cut (see FIG. 2) can be made during as few as a single rotation of lens L and blank B. Chips and other by-products of blank B typically will be cast into chute 110 during the cutting operation, permitting easy disposal of the waste materials using a detachable container, pouch, or similar device. To remove lens L and blank B, the operator need merely deactivate motor 22 and router motor 94 and reverse the steps used to insert the lens L and blank B.

The foregoing is provided for purposes of illustration, explanation, and description of embodiments of the present invention. Various modifications to and adaptations of the embodiments will be apparent to those of ordinary skill in the art and may be made without departing from the scope or spirit of the invention.

I claim:

1. Apparatus for replicating on a blank the contour of a lens having a periphery, comprising:
   a. a housing;
   b. first and second shaft segments positioned within the housing;
   c. means for positioning the lens intermediate the first and second shaft segments to form a unitary shaft adapted to rotate;
   d. means, attached to the housing and adapted to rotate, for penetrating and cutting the blank; and
   e. means, attached to the housing and adjustable relative to the penetrating and cutting means, for following the periphery of the lens, comprising:
      i. a follower shaft penetrating the housing;
      ii. means, connected to the follower shaft, for contacting the periphery of the lens;
      iii. a resilient member positioned about the follower shaft intermediate the housing and contacting means; and
      iv. means, engaging the following shaft opposite the housing from the resilient member, for fixing the follower shaft in position prior to operation of the apparatus.

2. Apparatus according to claim 1 in which the blank has opposed first and second faces and the penetrating and cutting means comprises a router bit adapted, in cooperation with the following means, to contact the blank at a selected angle to the first face of the blank during operation of the apparatus.

3. Apparatus according to claim 2 in which the selected angle is 90° for cutting the blank to the same size and peripheral contour as the lens.

4. Apparatus according to claim 3 in which each of the unitary shaft and penetrating and cutting means defines a respective longitudinal axis, further comprising:
   a. means for rotating the unitary shaft about its longitudinal axis at a first speed; and
   b. means for rotating the penetrating and cutting means about its longitudinal axis at a second speed greater than the first speed.

5. Apparatus according to claim 2 in which the selected angle is other than 90° for cutting the blank to a size not identical to that of the lens but of the same peripheral contour of the lens.

6. Apparatus according to claim 5 in which each of the unitary shaft and penetrating and cutting means defines a respective longitudinal axis, further comprising:
   a. means for rotating the unitary shaft about its longitudinal axis at a first speed; and
   b. means for rotating the penetrating and cutting means about its longitudinal axis at a second speed greater than the first speed.

7. Apparatus for replicating, on a blank having opposed first and second faces, the contour of a lens having a periphery, comprising:
   a. a base;
   b. a first shaft segment having a longitudinal axis;
   c. a second shaft segment having a longitudinal axis aligned with the longitudinal axis of the first shaft segment;
   d. means, connected to the base, for supporting the first and second shaft segments while permitting them to rotate about their respective longitudinal axes;
   e. means for positioning the lens intermediate the first and second shaft segments to form a unitary shaft having a longitudinal axis;
   f. means for rotating the unitary shaft about its longitudinal axis at a first speed;
   g. a cover, pivotally attached tot he base, adapted to be positioned in a first location when the lens is positioned intermediate the first and second shaft segments and in a second location when the apparatus is in operation;
   h. means, attached to the cover and having a longitudinal axis, for penetrating and cutting the blank when the cover is positioned in the second location;
   i. means for rotating the penetrating and cutting means about its longitudinal axis at a second speed greater than the first speed; and
   j. means, attached to the cover and adjustable relative to the penetrating and cutting means prior to operation of the apparatus, for following the periphery of the lens when the cover is positioned in the second location, comprising:
      i. a follower shaft penetrating the cover;
      ii. means, connected to the follower shaft, for contacting the periphery of the lens;
      iii. a resilient member positioned about the follower shaft intermediate the cover and contacting means; and
      iv. means, engaging the follower shaft opposite the cover from the resilient member, for fixing the follower shaft in position prior to operation of the apparatus.

8. Apparatus according to claim 7 in which the penetrating and cutting means comprises a router bit adapted, in cooperation with the following means, to contact the blank at a selected angle to the first face of the blank during operation of the apparatus.

9. Apparatus according to claim 8 in which the selected angle is 90° for cutting the blank to the same size and peripheral contour as the lens.

10. Apparatus according to claim 8 in which the selected angle is other than 90° for cutting the blank to a size not identical to that of the lens but the same peripheral contour of the lens.

11. Apparatus according to claim 10 further comprising means, connected to at least one of the cover and base, for receiving by-products of the blank cutting operation.

12. Apparatus according to claim 8 in which (1) the blank defines an opening for receiving the second shaft segment and (2) the second shaft segment comprises a plate, further comprising:
   a. means, adapted to engage the second shaft segment, for clamping the second face of the blank against the plate to hold the blank in position relative to the second shaft segment; and
   b. means for retracting the first shaft segment relative to the second shaft segment for permitting positioning of the lens intermediate the first and second shaft segments.

13. Apparatus according to claim 12 in which the second shaft segment further comprises a multi-segmented receptacle for receiving and securing in position a complementary multi-segmented plug removably attached to the lens.

14. Apparatus according to claim 13 in which the unitary shaft rotation means comprises:
   a. a first motor attached to the base; and
   b. a drive belt connected to the first motor and one of the first and second shaft segments.

15. Apparatus according to claim 14 in which the means for rotating the penetrating and cutting means comprises a second motor connected to the cover.

16. Apparatus according to claim 15 in which the means for contacting the periphery of the lens is rigidly connected to the follower shaft during operation of the apparatus.

17. Apparatus according to claim 16 further comprising means, connected to at least one of the cover and base, for receiving by-products of the blank cutting operation.

* * * * *

UNITED STATES PATENT AND TRADEMARK OFFICE
CERTIFICATE OF CORRECTION

PATENT NO. : 5,165,202
DATED : November 24, 1992
INVENTOR(S) : Gilbert D. Spindel, Jr.

It is certified that error appears in the above-identified patent and that said Letters Patent is hereby corrected as shown below:

Column 1, line 58, insert the word --a-- before the word "lateral"

Column 6, line 25, delete "tot he" and substitute --to the-- therefor

Column 6, line 63, insert the word --of-- after the word "but"

Signed and Sealed this

Twenty-sixth Day of October, 1993

Attest:

BRUCE LEHMAN

*Attesting Officer*   Commissioner of Patents and Trademarks